United States Patent
Krauss et al.

(10) Patent No.: US 9,461,461 B2
(45) Date of Patent: Oct. 4, 2016

(54) DEFECT INDICATOR FOR AN ELECTRONIC DEVICE, IN PARTICULAR SURGE ARRESTER

(71) Applicant: DEHN + SÖHNE GmbH + Co. KG, Neumarkt/Opf (DE)

(72) Inventors: Bernhard Krauss, Berg (DE); Stephan Hierl, Neumarkt (DE); Roland Eichenseer, Neumarkt (DE)

(73) Assignee: DEHN + SÖHNE GmbH + Co. KG, Neumarkt/OPF (DE)

( * ) Notice: Subject to any disclaimer, the term of this patent is extended or adjusted under 35 U.S.C. 154(b) by 225 days.

(21) Appl. No.: 14/388,646

(22) PCT Filed: Mar. 1, 2013

(86) PCT No.: PCT/EP2013/054149
§ 371 (c)(1),
(2) Date: Sep. 26, 2014

(87) PCT Pub. No.: WO2013/143802
PCT Pub. Date: Oct. 3, 2013

(65) Prior Publication Data
US 2015/0055265 A1    Feb. 26, 2015

(30) Foreign Application Priority Data

Mar. 26, 2012 (DE) .................. 10 2012 006 102
Jun. 4, 2012 (DE) .................. 10 2012 011 072

(51) Int. Cl.
*H02H 5/04* (2006.01)
*H01T 1/12* (2006.01)
*H01T 1/14* (2006.01)

(52) U.S. Cl.
CPC ............... *H02H 5/047* (2013.01); *H01T 1/12* (2013.01); *H01T 1/14* (2013.01)

(58) Field of Classification Search
USPC ........................................... 116/216
See application file for complete search history.

(56) References Cited

U.S. PATENT DOCUMENTS 1,512,817 A * 10/1924 Boyden .................. H02H 5/06
116/215

(Continued)

FOREIGN PATENT DOCUMENTS

DE    102006000919 A1    7/2007
DE    102006034404 A1    12/2007

(Continued)

OTHER PUBLICATIONS

International Search Report and Written Opinion for PCT/EP2013/054149 dated May 16, 2013.

*Primary Examiner* — Daniel S Larkin
*Assistant Examiner* — Irving A Campbell
(74) *Attorney, Agent, or Firm* — Kinney & Lange, P.A.

(57) ABSTRACT

The invention relates to a defect indicator for an electronic device, in particular a surge arrester, comprising at least two thermal overcurrent protection devices which respond to different fault or overload states and each have a mechanical actuating device for triggering the fault signalling, wherein the mechanical actuating device is in the form of a bolt or pin which acts on a fault signalling element. According to the invention, the at least two overcurrent protection devices are arranged relative to one another in such a manner that the direction vectors of the bolts or pins intersect in an imaginary extension of the movement path thereof, wherein the particular bolt or pin acts on a respectively provided surface side of a displaceable armature and the armature occupies a variable position in the movement path. The armature also has a further surface side which, in the event of an armature movement, in turn acts on the fault signalling element and displaces the latter, for example, and this further surface side comprises at least one wedge slope for this purpose in order to change the direction of force on account of the movement of one of the bolts or pins.

8 Claims, 4 Drawing Sheets

(56) References Cited

U.S. PATENT DOCUMENTS 4,176,618 A * 12/1979 Hubert .................. G08B 17/02
　　　　　　　　　　　　　　　　　　　　116/102
5,880,667 A * 3/1999 Altavela ................ H01H 37/52
　　　　　　　　　　　　　　　　　　　　116/216

FOREIGN PATENT DOCUMENTS

| | | |
|---|---|---|
| DE | 102007042991 A1 | 12/2008 |
| DE | 102009022069 A1 | 7/2010 |
| EP | 0239525 A1 | 9/1987 |

* cited by examiner

DEFECT INDICATOR FOR AN ELECTRONIC DEVICE, IN PARTICULAR SURGE ARRESTER

BACKGROUND

The invention relates to a defect indicator for an electronic device, in particular a surge arrester, comprising at least two thermal overcurrent protection devices which are responsive to different fault or overload conditions, each having a mechanical actuating device for triggering the fault signaling, wherein the mechanical actuating device is in the form of a stud or pin which acts on a fault signaling element.

Document DE 10 2006 000 919.3 discloses a pluggable surge arrester comprising one or several surge protection elements. The surge protection elements are disposed within a structural unit with an optical fault indicator. In addition, a thermal overcurrent protection device is provided which comprises a mechanical actuating device for triggering a remote signaling contact in order to signal a fault.

According to the object of this cited prior art a reliable triggering of the remote signaling contact for signaling a fault is to be achieved, by creating an innovative construction which is based on fixed tolerance chains so as to avoid an erroneous triggering of microswitches which are preferably used as remote signaling contact. The construction introduced in this document is to avoid adverse rocking movements and exclusively perform sliding movements, perpendicular to the plug-in direction of the arrester. To this end, a linearly guided slide is provided which is movable transversely to the plug-in direction of the arrester and is equipped with an elastic tongue acting as a stop. The free end of said elastic tongue is blocked by a locking element. The thermal overcurrent protection device is fitted with an actuating pin which acts upon the free end of the tongue when triggered in order to move said free end out of the blocked position. The slide has a free, web-shaped section which penetrates a corresponding opening in the arrester housing. The slide is released as soon as the actuating pin acts upon the free end of the tongue, and can carry out a longitudinal displacement. According to a preferred embodiment described in this document the thermal overcurrent protection device has a cylindrical shape, with an integrated spring-preloaded actuating pin. The pivoting direction of the free end of the aforementioned tongue and the direction of the movement of the actuating striker pin of the thermal overcurrent protection device are disposed on one axis, that is, the two directions substantially coincide.

In one embodiment of the slide, the indicator surface of the slide may comprise a color marking or be dyed. A cap for covering the surge arrester includes a viewing window on its upper side as part of the optical defect indicator.

According to the teaching of the cited DE 10 2006 000 919.3 document a mechanical actuating device based on a striker pin fuse is created in an easy manner, which is able to reliably trigger an optical indicator, respectively, remote signaling device. However, in case several elements to be monitored with respect to their operating behavior are provided in the surge arrester, several slides including a tongue and an associated actuating mechanism are required, which results in a mechanically and constructively very complex solution.

A surge arrester having at least one arrester element is already known from DE 10 2009 022 069 A1. In addition, a solder-fixed thermal disconnection point is provided, which is connected to the arrester element. Furthermore, a damage indicating device is provided, for displaying the fault state, wherein the damage indicating device additionally queries the state of a thermal disconnection device, in particular a fuse, and presents the possible fault states of the arrester element and of the disconnection device mechanically in an OR operation in a suitable visual way. The thermal disconnection device comprises a movable component, which is fixed by an indicating pin wire and is released after the melting or destruction of said wire.

The object to be realized by this teaching is to provide a damage indicator for all possible fault states with as few components as possible. To this end, a guide part for a compression spring or similar force accumulator is provided on or in the housing of the arrester. A first spring end acts on the thermal disconnection point, directly or indirectly, by way of a disconnection plunger or disconnection cylinder, and a second spring end of the force accumulator, opposite to the first end, acts on a slide, directly or indirectly, by way of a guide ring.

The slide is subjected to a force on a first side in the displacement direction directly by a further spring or indirectly by the damage indicating device. The second side of the slide, opposite to the first side, is operatively connected to the movable component of the thermal disconnection device in such a way that it follows the release movement of the movable component under the action of force from the compression spring.

The second side of the slide, opposite to the first side, is operatively connected to the movable component of the thermal disconnection device in such a way that it follows the release movement of the movable component under the action of force from the compression spring.

The second side of the prior slide is designed in such a way that a longitudinal slide movement is able to take place as a result of the force of the further spring with the thermal disconnection point triggered and the component of the thermal disconnection device fixed and also with an unchanged position between the slide and guide part and, furthermore, a reciprocating movement relative to the guide part is able to take place, with a subsequent longitudinal slide movement, with the indicator wire released, together with the movable component of the thermal disconnection device. The second end of the spring or at least part of the guide ring engages into a cut-out or depression in the slide in order to lock the latter and the damage indicating device in the proper state of the arrester. According to an embodiment the guide part includes an inner cylindrical area for receiving the compression spring and at least one section of the disconnection plunger or disconnection cylinder. The guide part may be an integral part of the housing. The damage indicating device may be pivotably movable and is guided on a bearing journal associated with the housing. The damage indicator further comprises a surface section which is provided with a signal color. By a movement of the damage indicating device inside a window section of the housing cap a color change can then be detected visually, and a possible fault state, e.g. from green to red, can be determined. Additionally, the damage indicating device can be provided with a prolongation or lever arm at one of its pivotably movable ends, which serves to trigger a remote signaling indicator.

The thermal disconnection device is designed as a cylindrical fuse with two opposite caps, wherein the movable component fixed by the indicator wire is disposed on one of the caps.

According to the above-described prior art a functional separation of the force accumulator function for the thermal disconnection point and for the movable component of the disconnection device on the one hand, and for the movement of the damage indicating device on the other hand is provided. This allows the separate monitoring of both units, which requires the coupling of different mechanical elements, however, and involves, all in all, a very complicated structure.

The overcurrent protection device for use in overvoltage protection apparatus with an additional mechanical triggering device, preferably configured as a striker pin, according to DE 10 2006 034 404 A1 comprises a first functional unit which includes, in addition to the mechanical triggering device, a first fusible element. A second functional unit is configured as an overload protection and has a second fusible element. Each functional unit is arranged in a housing, wherein on the respective housing lateral end caps are located on opposite sides and the fusible conductors or fusible elements are each located in the interior of the housing and are electrically contacted at the end caps. The first and the second functional units are electrically connected in parallel, and this parallel connection is connected in series with the actual overvoltage protection device. The functional units form a common mechanical grouping. A chamber for receiving a spring-preloaded striker pin is arranged at an end cap of the first functional unit, wherein the striker pin is held in its unoperated position by the first fusible element. The first fusible element is formed of a wire having a high tensile strength and a $I^2t$-value which is clearly smaller than that of the material of the second fusible element.

The known overcurrent protection device has a high, aging-stable pulsed current carrying capacity, a mechanical indicating function, respectively, support for such an indicating and signaling function, as well as a great switching capacity. The striker pin may serve to mechanically trigger an optical and/or electric indicator.

Based on the foregoing, it is the object of the invention to provide a further developed defect indicator for an electronic device, in particular a surge arrester, comprising at least two thermal overcurrent protection devices which are responsive to different fault or overload conditions, which is capable of indicating different triggering criteria, preferably fuse elements with indicating pins, on a single indicating element, e.g. a remote signaling device, as an OR operation and, furthermore, of allowing a more exact and more simple damage identification with respect to the individual overcurrent protection devices, respectively, fuse elements.

The solution to the object of the invention is achieved with the combination of features according to the teaching of patent claim 1. The dependent claims define at least useful embodiment and further developments.

Accordingly, there is proposed a defect indicator for an electronic device, in particular a surge arrester, comprising at least two thermal overcurrent protection devices which are responsive to different fault or overload conditions. The thermal overcurrent protection devices are preferably configured as fuse elements which have an internal indicating pin function. The overcurrent protection devices each have a mechanical actuating device for triggering the fault signaling, wherein the mechanical actuating device is in the form of a stud or pin which acts on a fault signaling element. This fault signaling element may be a color-coded slide or another optical indicator element. It may also be an electrical switching device, respectively, a means operative on an optocoupler.

According to embodiments of the invention, the at least two overcurrent protection devices (basically any number of overcurrent protection devices is possible) are arranged relative to one another in such a manner that the direction vectors of the studs or pins intersect in an imaginary extension of the movement path thereof.

The respective stud or pin acts on a respectively provided surface side of a displaceable anchor, wherein the anchor has a variable position in the movement path. The anchor is a constructively formed flat body, which is capable of receiving and transmitting the mechanical movement force of the respective stud or pin and, if applicable, of allowing a reversal of the direction of movement. In addition, the anchor itself may be used as an indicator with respect to the varied position thereof upon the action of the stud or pin.

The anchor comprises a further surface side which, in turn, acts on the fault signaling element in the event of an anchor movement. To this end, this further surface side includes at least one wedge bevel so as to obtain a change of the direction of force due to the movement of one of the studs or pins of the triggered overcurrent protection device.

The anchor movement may be carried out both as a traversing movement, i.e. linear movement, and a pivoting movement, respectively, rotational movement.

Preferably, the overcurrent protection devices are arranged in such a manner that the mechanical actuating devices are oriented substantially perpendicular to one another.

In one embodiment, a lever arm may be formed on the anchor so as to convert a traversing movement into a pivoting movement to allow the actuation of a switching device.

In a preferred embodiment, the anchor may comprise two opposite wedge bevels on the further surface side thereof so as to define a recess similar to a truncated cone. The oppositely oriented wedge bevels interact with the fault signaling element, wherein the fault signaling element is mounted in a guided manner with respect to the direction of movement thereof and has two complementary wedge bevels. In such an embodiment, the lateral displacement of the anchor results in a conversion of the direction of movement with respect of the fault signaling element, which changes its position perpendicularly to the lateral traversing movement of the anchor.

However, the anchor may also be configured as a pendulum-type body, moving both in the reciprocating motion thereof and perpendicularly thereto so as to cause, respectively, trigger the fault signaling.

In one embodiment, the anchor comprises markings on a surface side which is actuation-free with respect to the action of the studs or pins, respectively, the fault signaling element, which markings are visible or not visible in a window of the electronic device depending on the movement of the anchor carried out upon the triggering of one of the overcurrent protection devices, so that an exact damage identification with respect to the respectively defective overcurrent protection device is possible.

The anchor is held in a predefined position by the aforementioned complementary wedge bevels of the fault signaling element, wherein, to this end, the fault signaling element is mechanically preloaded.

In accordance with the invention is furthermore the use of the above-explained defect indicator, particularly in multipole overvoltage protection devices.

The invention will be explained in more detail below by means of an exemplary embodiment and with reference to the figures.

DETAILED DESCRIPTION

The basic idea of the invention reflected in the embodiments is based on the association of several, at least two, overcurrent protection devices which are arranged relative to one another and are configured, for instance, as fuse elements with indicating pins, and which act on a common indicator through an OR operation.

The anchor illustrated in the figures is displaced with respect to its position by a force acting on the anchor, especially that of the striker pin of the indicating pin.

Due to the geometrical implementation of the anchor body it is, in principle, irrelevant which indicating pin is displaced with respect to its position.

Figure 1:
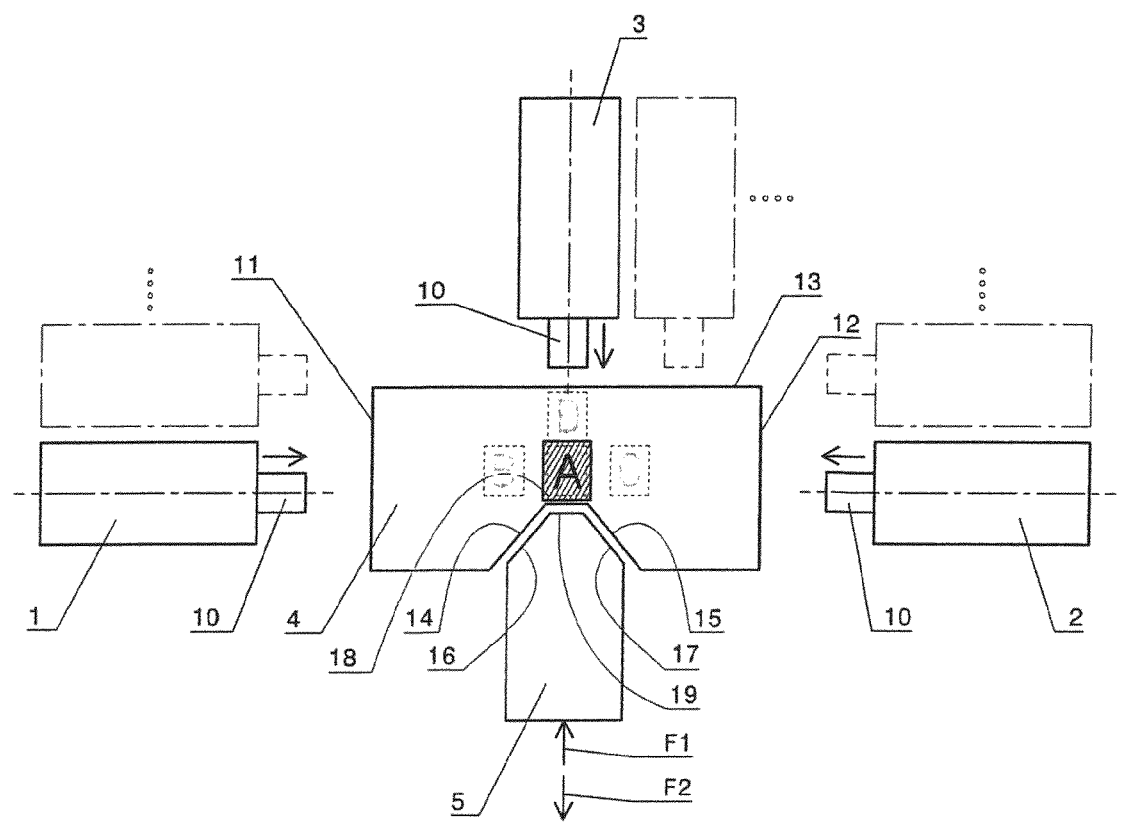
FIG. 1 shows a schematic view of the defect indicator comprising an anchor and a total of three thermal overcurrent protection devices, the thermal overcurrent protection devices each having a mechanical actuating device for triggering the fault signaling, and the anchor transmitting the corresponding movement of the studs of the overcurrent protection devices to a fault signaling element.

FIG. 1 shows a schematic top view of the solution according to the invention. An anchor 4 is a linearly displaceable flat body. A total of three indicating pins 1 to 3 are arranged around the anchor 4. The respective actuating device of the respective indicating pin 1 to 3, designed as a stud 10, acts on a respectively provided surface side of the displaceable anchor 4. That is, indicating pin 1 acts on surface side 11, indicating pin 2 acts on surface side 12 and indicating pin 3 acts on surface side 13 of the anchor 4.

Markings representing the status indication 6 are designated by capital letters A to D, with a viewing window being provided in the central area (A). A traversing movement of the anchor 4 (see FIGS. 2 to 4) can then be observed by the viewing window and the recognizable signaling design. The visible letters (e.g. B in FIG. 2) indicate that the indicating pin 1 has been triggered.

In the embodiments according to FIGS. 1 to 6 the anchor 4 comprises two opposite wedge surfaces 14 and 15, together resulting in a frusto-conical recess in the anchor 4.

The fault signaling element 5 formed, for instance, as an indicator or switch comprises complementary wedge bevels 16 and 17. A traversing movement of the anchor (see FIGS. 2 and 3) also results in a positional change of the fault signaling element 5.

The fault signaling element 5 may be preloaded by a force F1, with force F2 being greater than force F1 and being derived from the activated mechanical actuating devices.

With respect to the direction of movement the fault signaling element 5 is guided to be displaceably movable along force vectors F1 and F2.

Figure 2:
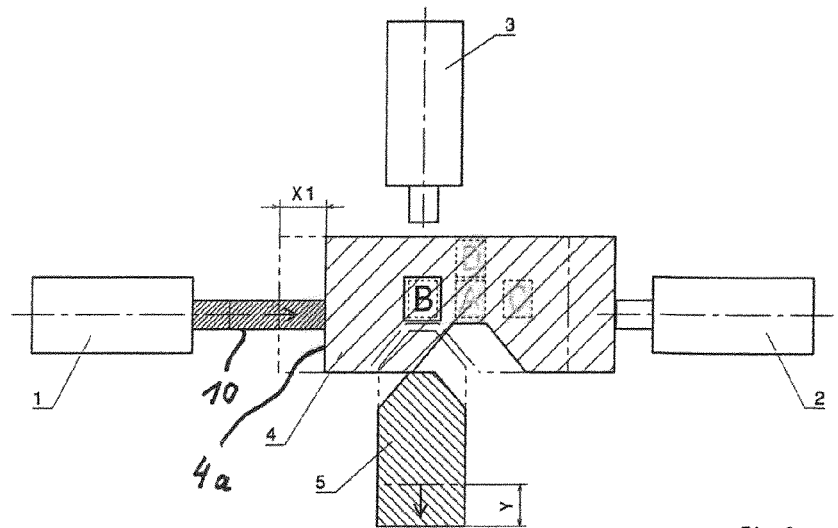
FIGS. 2 to 4 show detailed views of the movement situation, respectively, movement variation of the anchor, and upon the activation of the overcurrent protection device, e.g. configured as indicating pins 1 to 3.

If the indicating pin 1 is triggered, as shown in FIG. 2, the trigger force of the stud 10 is transmitted via surface 4a to the anchor 4, which is then linearly moved by dimension x1. The bevel (wedge surface) 14 arranged at a specific angle (see FIG. 1) transmits a force to the element 5 (surface 16, FIG. 1), which is then subjected to a linear movement by dimension Y.

Figure 3:
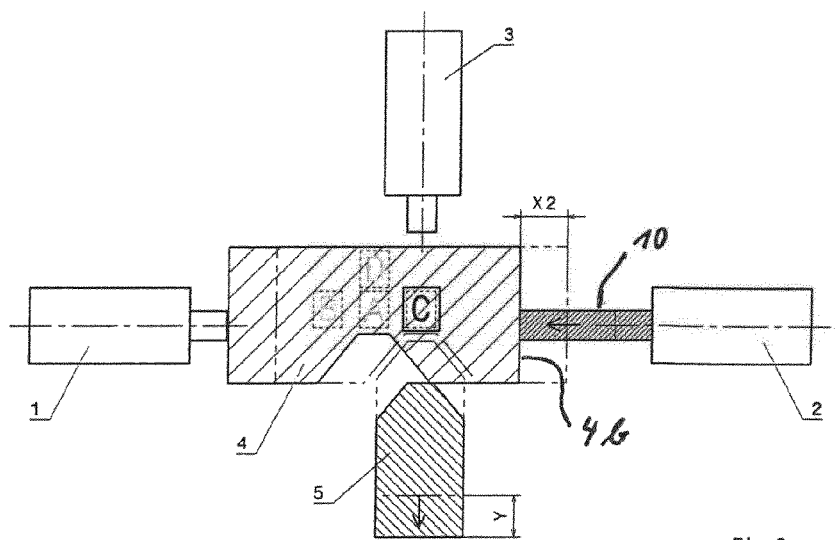

If the indicating pin 2 according to FIG. 3 is triggered the force is transmitted via surface 4b to the anchor 4. The anchor 4 is then moved by dimension x2. A transmission of movement and force to the element 5 (surface 17, see FIG. 1) is then carried out via the wedge bevel 15 (see FIG. 1), with element 5 being displaced by dimension Y.

Figure 4:
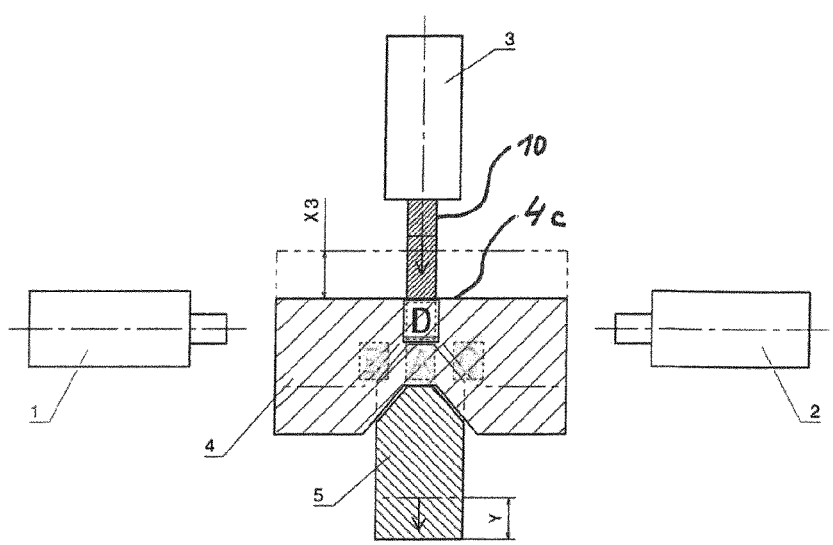

According to FIG. 4 indicating pin 3 is triggered. The corresponding trigger force is transmitted via surface 4c to anchor 4, which is thus moved by dimension x3. The anchor 4, which is carried along (dimension x3), transfers the movement force to element 5 (surface 19, see FIG. 1) which is displaced by distance Y.

Figure 5:
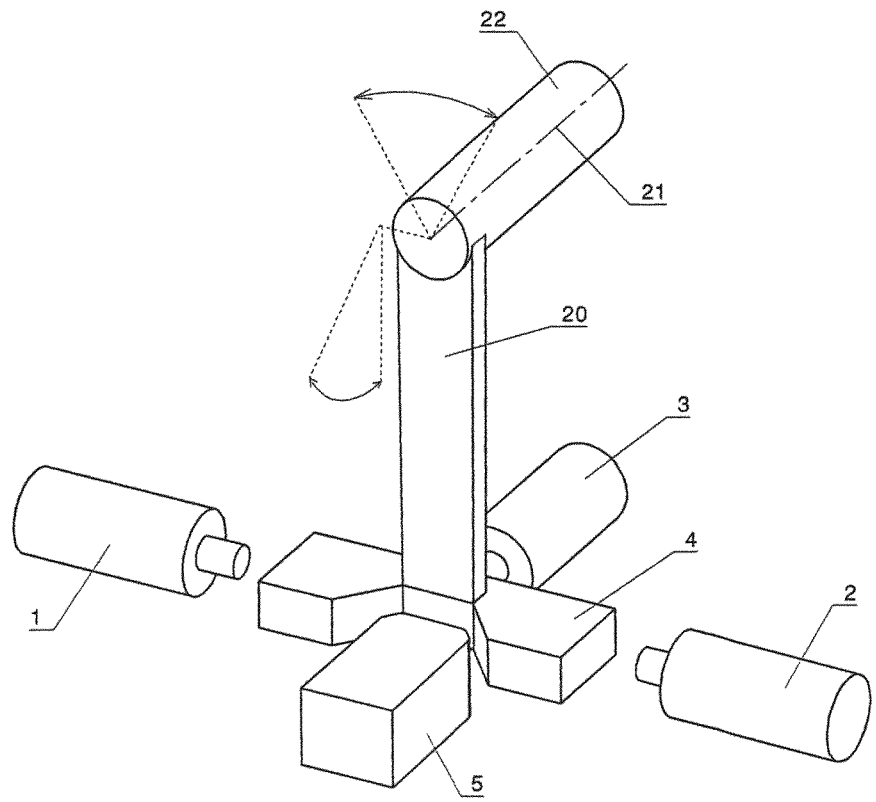
FIG. 5 shows a perspective schematic view of the design of the anchor, including a lever arm coupled to same to define an axis of rotation.
Figure 6:
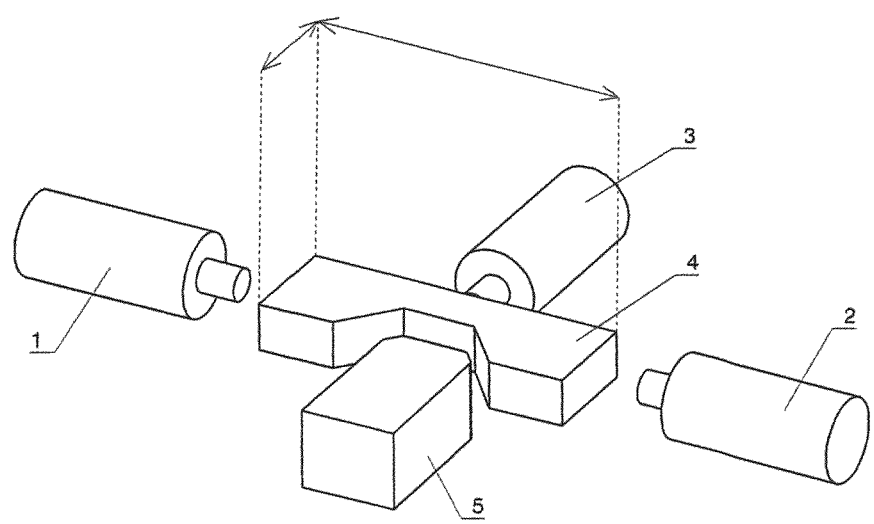
FIG. 6 shows a perspective view similar to the view of FIG. 1, depicting the linear directions of movement of the anchor.

According to the representations shown in FIGS. 5 and 6, the anchor 4 may be mounted linearly (FIG. 6) or in a rotatable manner (FIG. 5), whereby it is possible to convert by means of the lever arm 20 the traversing movement of the anchor 4 into a pivoting movement, namely relative to the axis of rotation 21, so as to obtain a rotational movement for a switching or indicating device 22.

It is also possible to tilt the lever arm 20 from the image plane in a forward direction in order to activate the fault signaling element 5. To this end, a film hinge may be used, or the lever arm may be flexible.

Figure 7:
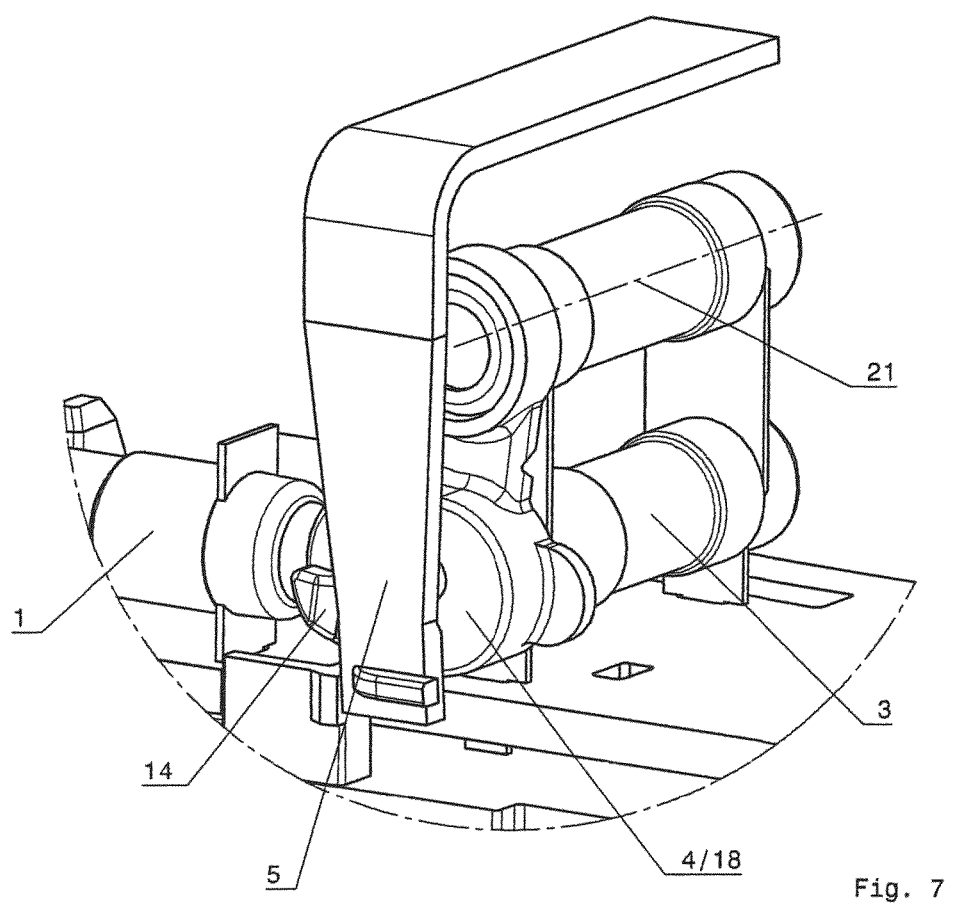
FIG. 7 shows an exemplary, constructively implemented solution of an anchor carrying out a reciprocating movement, whereby additionally a movement of the anchor perpendicular to the pendulum-type travel may be realized so as to monitor overcurrent protection devices, which are oriented substantially perpendicular to one another, with respect to their functional states and pass on a possible failure to a common indicator element.

An embodiment realizing a reciprocating movement with a deflection of the anchor 4 perpendicular to the direction of the pendulum-type travel is shown in a technically constructive implementation according to the illustration of FIG. 7.

According to FIG. 6, a linear traversing movement of the anchor 4 along the depicted arrows is assumed. In this case, the anchor 4 may simultaneously be configured as an indicating device or be operatively connected to an indicating element according to the prior art described above.

The illustrations show that the number of indicating pin elements, i.e. of the overvoltage protection devices, is basically unlimited. Extending the surfaces 4a to 4c, respectively, 11 to 13 according to FIG. 1 allows the arrangement of a great number of indicating pins, each acting identically on the anchor.

The anchor may also act on an electric remote signaling unit, configured for instance as a microswitch, and additionally interact with a viewing window, meaning an indication of active, i.e. triggered overcurrent protection devices, symbolized by the capital letters A to D.

Hence, it is possible to represent the indicating pin, respectively, overcurrent protection device that has been triggered. This allows a status indication of single paths in multipole overvoltage protection devices. This status indication may be visually representable in the form of a remote signaling and, at the same time, also directly on the apparatus.

Alternatively, the use of the principle according to the invention also allows the indication of a step-wise pre-existing damage of an overvoltage protection device. In contrast to the prior art not only two- or three-stage, but four-stage indicating mechanisms can be realized.

FIG. 7 shows an exemplary constructively implemented solution using an anchor that is capable of carrying out a reciprocating movement. Additionally, it is possible to carry out an anchor movement perpendicular to the pendulum-type travel so as to monitor overcurrent protection devices oriented perpendicular to one another with respect to their functional states and pass on a possible failure to a common indicating element. The overcurrent protection devices are designated with reference numbers 3 and 21 in FIG. 7. The other components illustrated in FIG. 7 are designated with reference numbers that correspond to the functional elements according to the above-described embodiments.

The invention claimed is:

1. A defect indicator for an electronic device, comprising at least two thermal overcurrent protection devices which are responsive to different fault or overload conditions, each having a mechanical actuating device for triggering fault signaling, wherein the mechanical actuating device is in the form of a stud or pin which acts on a fault signaling element, wherein:

the at least two thermal overcurrent protection devices are arranged relative to one another in such a manner that direction vectors of the studs or pins intersect in an imaginary extension of a movement path thereof, wherein a respective stud or pin acts on a respectively provided surface side of a displaceable anchor, and the anchor has a variable position in the movement path, but is also disposed in a point of intersection of the imaginary extension of the movement paths of the studs or pins, furthermore the anchor has a further surface side which, in turn, acts on the fault signaling element in the event of an anchor movement and, the further surface side includes at least one wedge bevel so as to obtain a change of direction of force due to movement of one of the studs or pins.

2. The defect indicator according to claim 1, wherein the anchor movement is a traversing movement or a pivoting movement.

3. The defect indicator according to claim 1, wherein the overcurrent protection devices are arranged in such a manner that the respectively adjacent mechanical actuating devices are oriented substantially perpendicular to one another.

4. The defect indicator according to claim 1, wherein a lever arm is formed on the anchor so as to convert a traversing movement of the anchor into a pivoting movement to allow actuation of a switching device.

5. The defect indicator according to claim 1, wherein the anchor comprises two opposite wedge bevels on the further surface side thereof which interact with the fault signaling element, wherein the fault signaling element is mounted in a guided manner with respect to the direction of movement thereof and has two complementary wedge bevels.

6. The defect indicator according to claim 5, wherein the anchor is held in a predefined position by the complementary wedge bevels of the fault signaling element and the fault signaling element is mechanically preloaded.

7. The defect indicator according to claim 1, wherein the anchor is configured as a pendulum-type body and is movable both in reciprocating motion thereof and perpendicularly thereto.

8. The defect indicator according to claim 1, wherein the anchor comprises markings on a surface side which is actuation-free, which markings are visible in a window of the electronic device depending on the movement of the anchor carried out upon the triggering of one of the overcurrent protection devices, so that an exact damage identification with respect to the respective overcurrent device or a state of the electronic device is possible.

* * * * *